No. 661,634. Patented Nov. 13, 1900.
T. S. BROWN.
DRAFT GEAR FOR HARVESTERS.
(Application filed Apr. 2, 1900.)
(No Model.) 2 Sheets—Sheet 2.
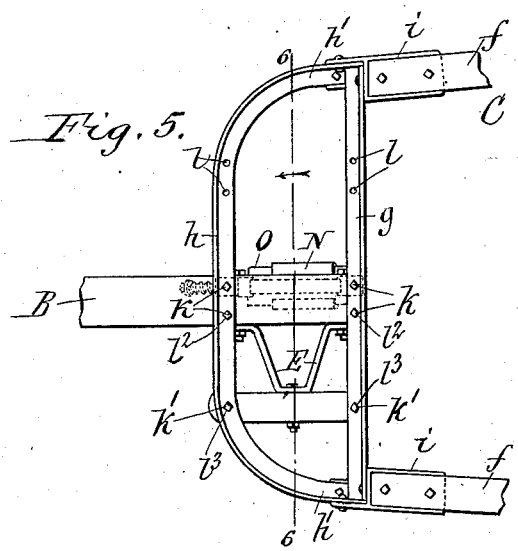
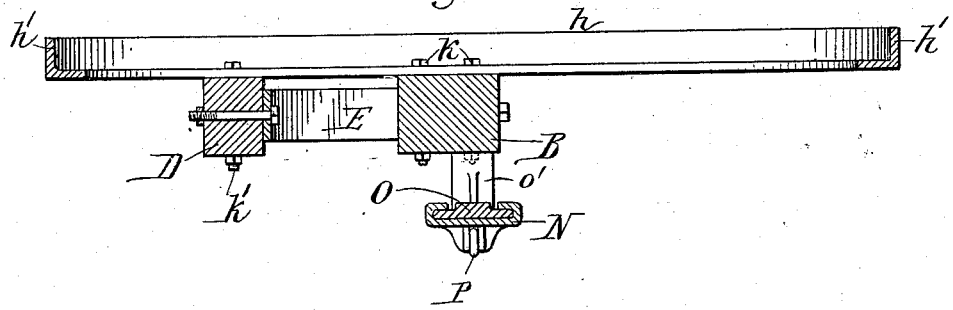

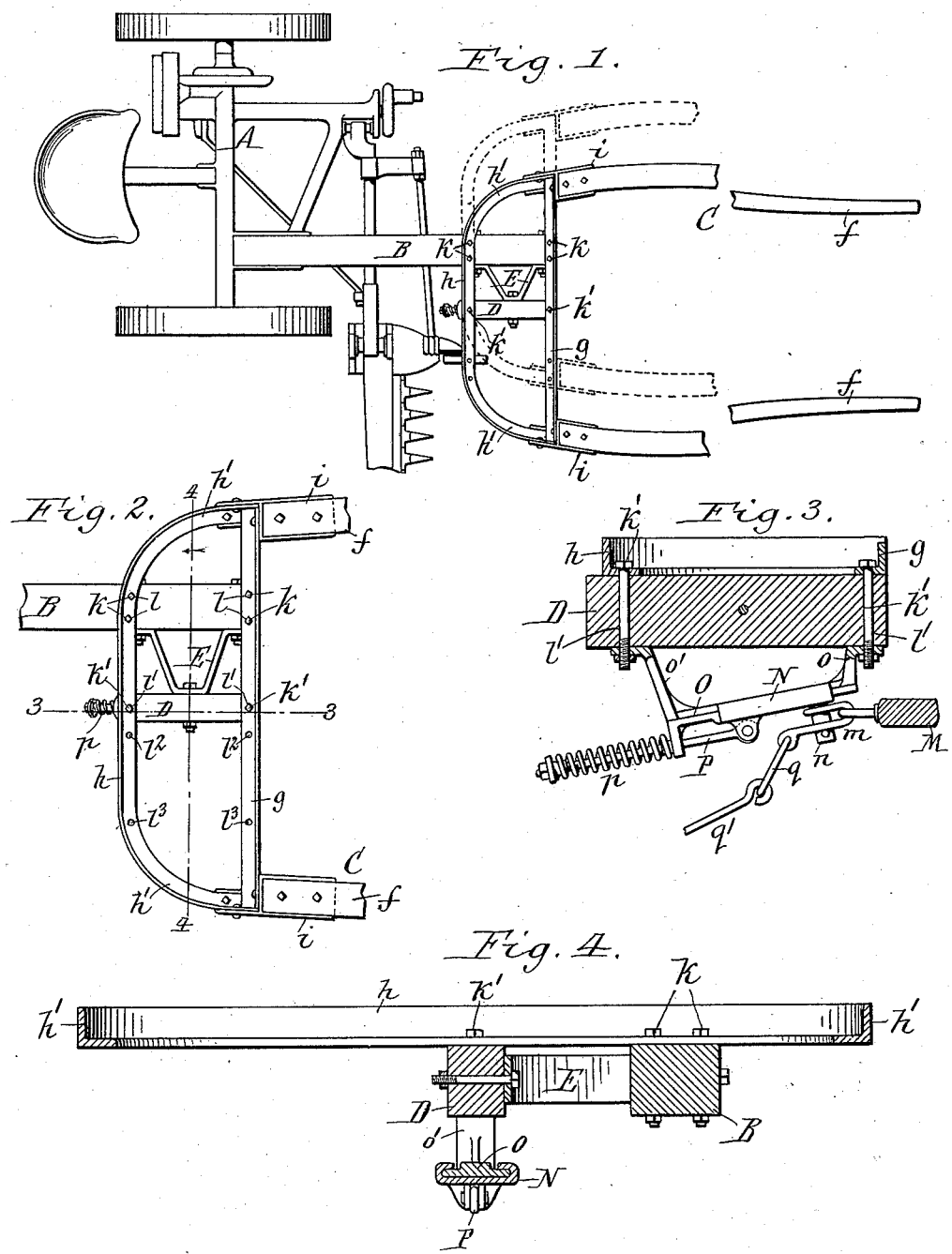

UNITED STATES PATENT OFFICE.

THOMAS S. BROWN, OF POUGHKEEPSIE, NEW YORK, ASSIGNOR TO THE ADRIANCE, PLATT & COMPANY, OF SAME PLACE.

DRAFT-GEAR FOR HARVESTERS.

SPECIFICATION forming part of Letters Patent No. 661,634, dated November 13, 1900.

Application filed April 2, 1900. Serial No. 11,211. (No model.)

*To all whom it may concern:*

Be it known that I, THOMAS S. BROWN, a citizen of the United States, and a resident of Poughkeepsie, in the county of Dutchess, in the State of New York, have invented a new and useful Improvement in Draft-Gear for Harvesters, of which the following is a specification.

This invention relates to the draft-gear for that class of harvesting-machines which are drawn by a single horse or other draft-animal and which are used interchangeably for mowing grass and for reaping grain. When the machine is used for mowing, the draft-animal should travel in a track which is about in line with the grainward wheel or the inner end of the finger-bar, in which track the horse injures neither the standing grass nor the cut grass. In order to allow the horse to travel in this track, the thills must be arranged toward the grainward side of the machine. When the machine is used for reaping grain, this position of the thills is not admissible, as the thills would strike the standing grain, and it is therefore necessary to shift the thills to a central position in order to adapt the machine for reaping.

The object of my invention is to provide simple, efficient, and convenient means for adjusting the thills and the draft device laterally, so that they can be placed either in the proper position for mowing or for reaping.

In the accompanying drawings, consisting of two sheets, Figure 1 is a top plan view of a mower, showing the thills in full lines in the position for mowing and in dotted lines in the position for reaping. Fig. 2 is a top plan view, on an enlarged scale, of the rear portion of the thills and connecting parts in the position for mowing. Fig. 3 is a longitudinal sectional elevation of the draft device in line 3 3, Fig. 2, on a still further enlarged scale. Fig. 4 is a vertical cross-section in line 4 4, Fig. 2, on an enlarged scale. Fig. 5 is a top plan view, on an enlarged scale, of the rear portion of the thills and connecting parts in the position for reaping. Fig. 6 is a vertical cross-section in line 6 6, Fig. 5, on a still further enlarged scale.

Like letters of reference refer to like parts in the several figures.

A represents the frame of the harvester, which may be of any suitable construction.

B represents a short or stub pole, which is secured to the frame for supporting the thills C.

D represents an auxiliary draft-stub, which is arranged longitudinally on the grainward side of the pole and at a suitable distance therefrom. This draft-stub is secured to the grainward side of the pole by a bracket E. The latter and the auxiliary draft-stub form a lateral extension or enlargement of the pole, on the grainward side thereof, for supporting the thills and the draft device when the thills are placed in the position for mowing, as shown in full lines in Figs. 1, 2, 3, and 4. The thills consist of longitudinal front portions $f$, which are preferably formed of wood, and a rear frame which is preferably constructed of iron or steel—for instance, angle-iron or steel, as shown, although other forms of commercial iron or steel may be employed. This metallic rear frame of the thills consists of a front cross-bar $g$, a rear cross-bar $h$, which has its ends $h'$ curved forwardly to connect with the ends of the front cross-bar, and connecting-shoes or socket-plates $i$, to which the ends of the frame-bars and the front portions of the thills are secured. The two cross-bars of the thill-frame rest upon the pole and the auxiliary stub, to which they are secured by bolts $k\,k'$. As shown, two pairs of bolts $k$ are provided for securing the frame-bars to the pole, and two single bolts $k'$ for securing the bars to the auxiliary stub. The bolt-holes of the frame-bars are arranged in such manner that these bolts can be applied in either position of the thills. In Fig. 2 the bolts are arranged in the bolt-holes $l\,l'$ of the frame-bars, which holes are arranged in the proper position for bolting the thill-frame to the pole and stub when the thills are in the position for mowing. The extra bolt-holes $l^2\,l^3$ are provided for bolting the thill-frame to the pole and stub in the position of the thills for harvesting, as shown in Figs. 5 and 6.

The draft device may be of any suitable construction and is secured to the under side of the stub when the thills are in the position for mowing, as shown in Figs. 2, 3, and 4, and to the under side of the pole when the thills are in the position for reaping, as shown in Figs. 5 and 6.

The draft device shown in the drawings is constructed substantially as shown in Letters Patent No. 594,596, granted to Adriance, Platt & Co., as assignee of myself, November 30, 1897, and consists, briefly stated, of the following parts: M represents the whiffletree, which is hung to a clevis $m$. The latter is carried by a bolt $n$, which depends from a slide N. This slide is mounted on a longitudinal guide-bar O, on which the slide can move backward and forward and which is provided at its front and rear ends with upwardly-projecting arms $o\ o'$, by which it is attached to the under side of the pole or of the stub, according to the position of the thills. The slide N is provided with a rearwardly-projecting rod P, to which a draft-spring $p$ is applied. The clevis $m$ is connected by a link $q$ with an auxiliary draft-rod $q'$, which connects with the coupling-bar of the mower. (Not shown.)

When the thills are required to be changed from one position to the other, the bolts are released and withdrawn, thereby disconnecting the thills from the pole and auxiliary stub and detaching the draft device. The thills are then shifted to the desired position and secured, together with the draft device, to the pole and auxiliary stub. In the grainward position of the thills (shown in Figs. 1 to 4) the draft device is arranged underneath the auxiliary stub and is carried by the same. In the central position of the thills (shown in Figs. 5 and 6) the draft device is arranged underneath the pole, near the stubbleward side thereof, and is carried by the pole.

I claim as my invention—

1. In a harvester, the combination with the pole having a lateral extension on the grainward side, of thills provided at the rear end with a frame which rests upon said pole and extension and is laterally adjustable thereon to permit the thills being placed in the position for mowing or for reaping, and means whereby said thill-frame can be secured in either adjusted position, substantially as set forth.

2. In a harvester, the combination with the pole having a lateral extension on the grainward side, of thills provided at the rear end with a frame which rests upon said pole and extension and is laterally adjustable thereon to permit the thills being placed in the position for mowing or for reaping, means whereby said thill-frame can be secured in either adjusted position, and a draft device adapted to be secured to the under side of the pole or its lateral extension to correspond to the position of the thills, substantially as set forth.

3. In a harvester, the combination with the pole having on the grainward side a lateral extension composed of a longitudinal stub and a connecting-bracket, of thills having a rear frame provided with front and rear crossbars which rest upon said pole and stub and are laterally adjustable thereon, and means whereby said cross-bars can be secured to the pole and stub in their adjusted positions, substantially as set forth.

Witness my hand this 28th day of March, 1900.

THOS. S. BROWN.

Witnesses:
CHARLES LOUIS PULSIFER,
HOWARD A. SOMERS.